United States Patent [19]

Fowler

[11] 3,931,019
[45] Jan. 6, 1976

[54] REINFORCED COALESCING CELL

[75] Inventor: Leslie L. Fowler, Tulsa, Okla.

[73] Assignee: Products and Pollution Controls Co., Tulsa, Okla.

[22] Filed: Feb. 18, 1975

[21] Appl. No.: 550,188

Related U.S. Application Data

[63] Continuation-in-part of Ser. No. 408,458, Oct. 23, 1073, abandoned.

[52] U.S. Cl. ............ 210/485; 210/489; 210/DIG. 5
[51] Int. Cl.² ......................................... B01D 25/22
[58] Field of Search.... 210/222, 192, 198, 489–491, 210/448, 485, 502–510, DIG. 5

[56] References Cited
UNITED STATES PATENTS

| | | | |
|---|---|---|---|
| 926,038 | 6/1909 | True ............................. | 210/485 X |
| 2,164,142 | 6/1939 | Moore ............................. | 210/490 |
| 2,395,301 | 2/1946 | Sloan ............................. | 210/505 X |
| 2,405,838 | 8/1946 | Lawson et al. ................. | 210/DIG. 5 |
| 3,016,345 | 1/1962 | Price ............................. | 210/DIG. 5 |
| 3,228,527 | 1/1966 | McPherson .................... | 210/DIG. 5 |
| 3,231,091 | 1/1966 | Kingsburn et al. ............. | 210/DIG. 5 |
| 3,241.680 | 3/1966 | Humbert, Jr. ................... | 210/484 |

*Primary Examiner*—John Adee

[57] ABSTRACT

A cell for coalescing oil droplets dispersed in a water emulsion including a perforated core into which the emulsion is injected, a layer of emulsion breaking fibrous material wound about the core through which the emulsion passes, and a helical wire wrapping on the outside of said fibrous material. The wire wrapping is of selected tension and spacing.

3 Claims, 3 Drawing Figures

REINFORCED COALESCING CELL

CROSS REFERENCE TO RELATED APPLICATION

This is a continuation-in-part of application Ser. No. 408,458, filed Oct. 23, 1973, entitled: REINFORCED FILTER CELL and now abandoned.

BACKGROUND AND SUMMARY OF THE INVENTION

A problem frequently encountered in industry is that of separating oil from a water emulsion. While the problem may arise in many ways, an example is that which occurs when oil is spilled on the surface of water, such as when an underwater pipeline breaks, a tanker carrying crude develops a leak or breaks up in a storm, or the like. In addition to these accidental instances wherein water is mixed with oil, in many industries the problem occurs as a normal part of manufacturing and treating processes utilizing methods and facilities wherein the mixing of oil and water cannot be averted.

In all these instances it is necessary to provide some means of extracting or separating the entrained oil from the water. In a broader sense the problem is that of separating an entrained immiscible liquid from a water base medium, oil and other petroleum products being good examples of such immiscible liquids.

One of the best known methods of separating oil from water is the use of a coalescing cell. As an example, reference may be had to U.S. Pat. No. 3,450,632 which describes a method of separating oil dispersed in a liquid medium by coalescing the oil droplets. The emulsion is passed through fibrous material which causes the dispersed oil droplets to coalesce and float to the surface of the water.

This invention relates to a method of improving the effectiveness of coalescing oil droplets suspended or entrained in a water phase. More particularly, the invention is directed towards improving the effectiveness of the coalescing action of fibrous materials through which oil and water emulsions are passed.

OBJECTS OF THE INVENTION

It is an object of this invention to provide an improved cell for coalescing oil droplets dispersed in a water emulsion.

More particularly, an object of this invention is to provide a method of improving the coalescing of oil droplets dispersed in a water emulsion.

Still more particularly, the invention relates to a cell comprising a central tubular perforated core with at least one batt of fibrous material wound around the outside of said batt and a helical wound reinforcing wire wound on the exterior cylindrical surface of the fibrous material, said winding of selected tension and spacing.

These general objects, as well as other objects, will be fulfilled in the apparatus and method to be described, taken in conjunction with the attached drawings.

DESCRIPTION OF VIEWS

DETAILED DESCRIPTION

Figure 1:
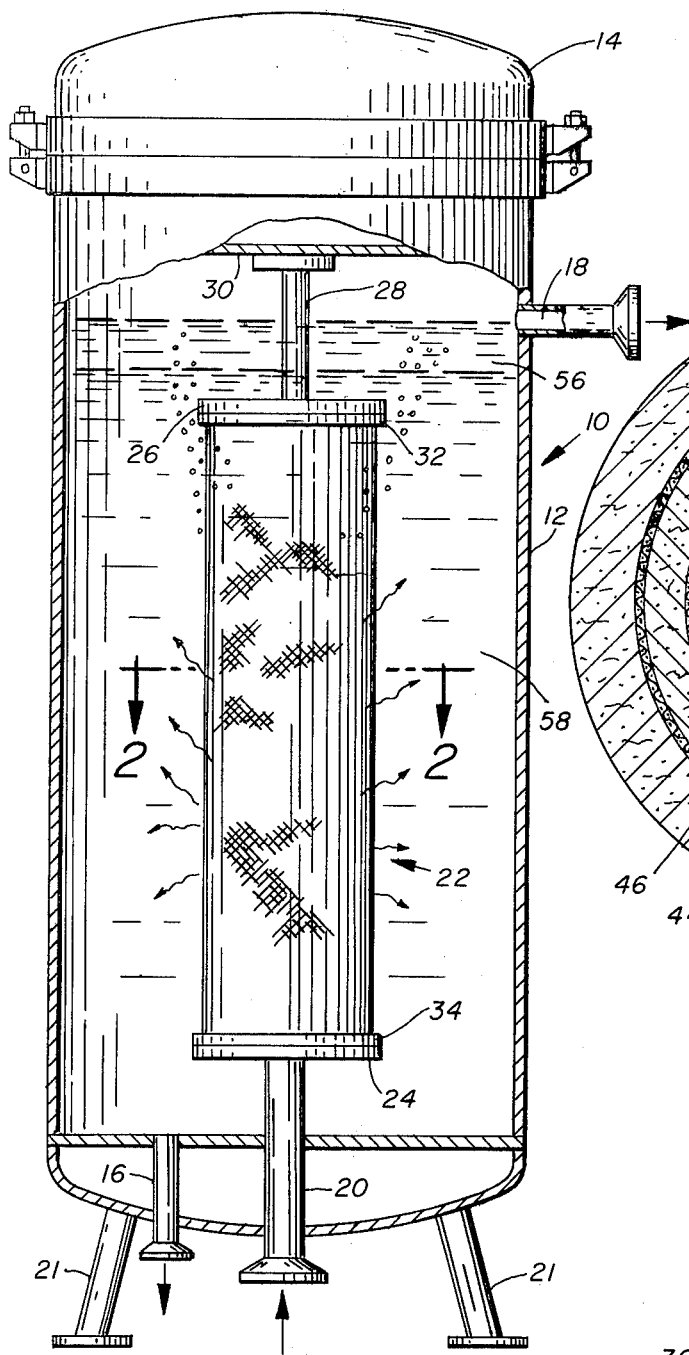
FIG. 1 is an elevational view of an embodiment of a separator for separating oil suspended in a water emulsion, the separator being shown partially cut away to show an elevational view of an improved cell for coalescing oil droplets dispersed in a water emulsion.

Referring to the drawings and first to FIG. 1, an oil-water separator is generally indicated by a numeral 10. The separator includes a vessel 12 having a removable top 14, a water outlet 16 in the bottom thereof and oil outlet 18 in the side wall adjacent top 14. Vessel 12 is supported on legs 21. Emulsion is introduced into the vessel through inlet 20. Positioned within the vessel is a cell, generally indicated by the numeral 22, which performs the function of coalescing oil droplets entrained in the emulsion introduced through inlet 20 to effect the separation of the two liquids.

The upper end of inlet 20 is provided with a plate 24. An opposed upper plate 26 is affixed to the lower end of a downwardly extending rod 28 affixed to the interior of the vessel, such as to a bar 30 extending across the top portion. Thus the cell 22 is positioned between plates 24 and 26 in a manner to receive the flow of emulsion from inlet 20.

The specific arrangement for supporting cell 20 in vessel 10 is illustrated as an example only and is not a part of the invention. Many means are known for supporting filter cartridges and the like in vessels in a removable and leakproof arrangement all of which may be utilized in practicing the invention.

The essence of the invention is the construction cell 22. As shown in FIG. 1, the cell 22 includes an upper end cap 32 which sealably engages plate 26 and a lower end cap 34 which engages lower plate 24.

Figure 2:
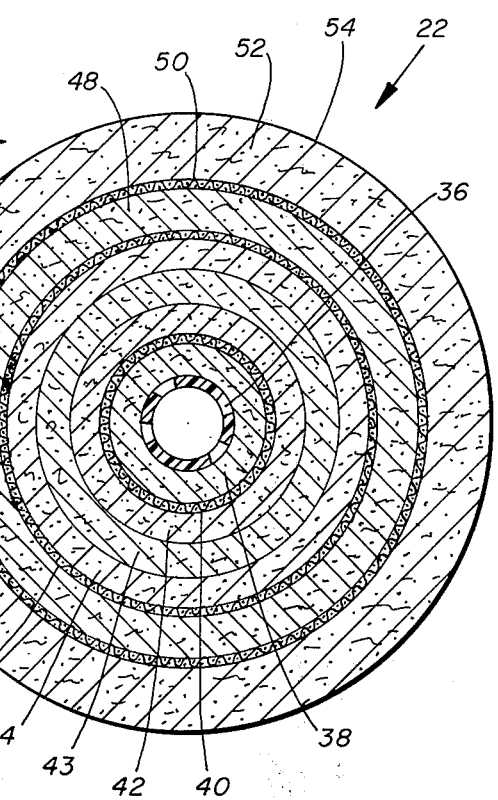
FIG. 2 is a cross-sectional view taken along the line 2—2 of the cell of FIG. 1 showing the construction of the cell.

Referring to FIG. 2, a cross-sectional view of cell 22, the construction of the cell is best illustrated. The cell includes an elongated perforated core tube 36. By means of an opening in lower end cap 34 the interior of core tube 36 communicates with the interior of inlet 20 so that emulsion injected into inlet 20 flows into the interior of core tube 36 and out through the perforations therein. Wound about core tube 36 is a plurality of layers of material having the characteristic of achieving the coalescence of dispersed oil droplets. The layers may vary as to composition, porosity, density, thickness and so forth. As an example, the first layer 38 surrounding core tube 36 may be of emulsion breaking fibrous material, such as polyester fibers, acrylic fibers, modacrylic fibers or fiberglass. The next layer 40 may be a structural layer, such as a fiberglass screen to protect the outer layers of material from inlet fluid pressures.

The next three layers 42, 43 and 44 may be of fibrous material such as the material above mentioned. The layers may be of varying densities. Next may be provided a fiberglass layer 46 followed by a fiber layer 48 and a third fiberglass layer 50.

The cell described to this point is not unlike other cells of known use for coalescing dispersed oil droplets in a water emulsion to separate oil from water. The improvement of this invention is the provision of means for augmenting the efficiency and effectiveness of coalescing of oil droplets as they migrate outwardly from the core tube 36 to the exterior of the cell 22. The essence of this invention is the provision of improved means of causing the coalescence of oil droplets. It has been learned that by wrapping the outer layer 52 of fibrous material with a selected metal of selected tension and spacing between turns the capability of the cells are enhanced for the formation of large drops or globules of oil as the emulsion passes from the interior to the exterior of the cell.

The purpose of the wrapping is to vary the density, porosity and permeability in accordance with the type of mixture, to enhance the separation of the oil and water. When the wire turns are spaced widely apart, there is considerable variation in density, porosity and permeability along the length of the cell. This permits the fluid mixture to seek the conditions that are best for the separation of the oil into droplets. Also, as the interstices between the fibers become clogged with dirt, wax, etc., as more and more mixture is passed through the cell the portions of the cell between the wires turns, where the spacings between the fibers were originally greatest, are still available for the passage of fluid, etc. This permits longer operating cycles between cleaning, for example.

The cell of this invention may be employed utilizing vessels having many configurations that substantially depart from that of vessel 10 and in which the cells are arranged in many different ways. In addition, the configuration of the cell required to practice the invention may depart drastically from the illustrated embodiment.

As shown in FIG. 1 the emulsion entering inlet 20 passes outwardly through the cell 22. As the dispersed oil droplets migrate through the cell they are caused to coalesce into larger droplets by the action of the emulsion breaking fibrous material. As the oil droplets move to the exterior of the cell they grow in size sufficient to form globules which overcome the surface tension of the cell and the water to arise to the surface to form a layer of oil 56. The oil thus accumulates on top of water 58 contained in the lower portion of the vessel.

The collected oil 56 passes out of the vessel through outlet 18 while water is drawn off through outlet 16. Means must be provided for maintaining the level of water in vessel 12. Many different means are known and utilized in industry for this purpose, including the use of interface floats (not shown).

The tension and spacing of the wire applied to a cell varies depending upon these primary factors:

a. the design pressure differential between the interior and exterior of the cell, that is, the pressure drop of fluid flowing through the cell;

b. the material of which the cell is made, short fiber material and nonwoven material requiring closer spacing than woven or long fiber material.

Filter cells of the type described of four to 6 inches in diameter have been constructed to withstand a pressure differential of approximately 60 pounds. When the filter media is of nonwoven fibrous material, stainless steel wire of about 0.032 inch diameter is helically wound on the cells with spacing of about ½ inch. When the cells are intended for use for higher pressure applications, such as in the 70 to 80 pound range, the spacing between the wire is reduced to ¼ inch. When the cells are constructed with filter media of woven long fiber material, such as long fiber cellulose or plastic materials, the spacing of the wire is reduced to one inch.

Figure 3:
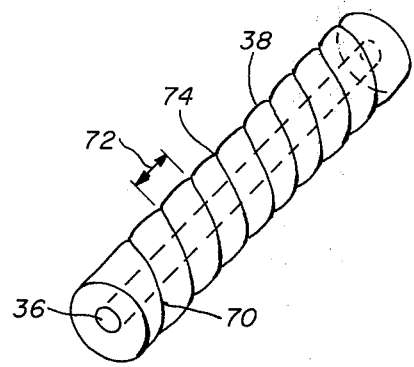
FIG. 3 is an exterior view of the cell containing a tubular core and wrapping of fibrous material, bound by a helical wire wrapping.

The wire is applied by rotating the cells with the wire being fed onto the cells. Sufficient tension is applied to the wire as it is fed onto the exterior of the rotating cells so that the wire causes a crease or helical indentation in the cylindrical surface of the cell, such that the radius from the axis of the cell to the point contacted by wire is less than the radius to the exterior of the filter media between the spaced wires, as illustrated in FIG. 3.

The wire may be wound on the rotating cell manually or by machine. The tension applied to the wire is preferably in the range of 10 to 25 pounds, with a tension of between 15 to 18 pounds being that which provides the desired results of reinforcing the cell without unnecessary stress on the cell fibrous materials.

The preferred embodiment of the invention utilizes a stainless steel wire of about 0.032 inch diameter, applied to the exterior of a cell to form a helical indentation therein, the wire being spaced apart from ¼ inch to 1 inch and applied with a tension of about 10 to 25 pounds. As long as the pressure differential and materials remain the same, the diameter of the cell does not materially change the wire spacing.

While the invention has been described with a certain degree of particularity, it is manifest that many changes may be made in the details of construction, the steps of practice, and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element or step thereof is entitled.

What is claimed:

1. A coalescing cell for use in coalescing oil dispersed in a water emulsion, comprising:

an elongated perforated tube core into which emulsion is injected;

at least one layer of emulsion breaking fibrous material wound around said core through which emulsion is forced to pass; and a length of wire wound helically on the exterior cylindrical surface of said fibrous material, the wire being wound thereon with a tension of about 10 to 25 pounds, the spacing between the wire being between ¼ inch and 1 inch, the wire forming a helical indentation in the cylindrical surface of the fibrous material.

2. A coalescing cell according to claim 1 wherein said wire is of stainless steel and of a diameter of about 0.032 inch.

3. A coalescing cell according to claim 1 in which said wire is wound on said cell at a tension of between 15 and 18 pounds.

* * * * *